United States Patent
Heins et al.

(10) Patent No.: US 8,603,301 B2
(45) Date of Patent: Dec. 10, 2013

(54) METHOD FOR REDUCTION OF CONTAMINANTS IN EVAPORATOR DISTILLATE

(75) Inventors: William F. Heins, Redmond, WA (US); Gregg L. Wilson, Redmond, WA (US)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 12/893,567

(22) Filed: Sep. 29, 2010

(65) Prior Publication Data

US 2011/0079503 A1  Apr. 7, 2011

Related U.S. Application Data

(60) Provisional application No. 61/278,376, filed on Oct. 5, 2009.

(51) Int. Cl.
| | | |
|---|---|---|
| *B01D 3/34* | (2006.01) | |
| *C23F 11/00* | (2006.01) | |
| *B01D 47/06* | (2006.01) | |
| *B01D 1/22* | (2006.01) | |
| *B01D 45/08* | (2006.01) | |

(52) U.S. Cl.
USPC ........ 203/7; 203/12; 203/24; 203/26; 203/36; 203/40; 159/47.3; 159/49; 95/267; 55/462; 55/464

(58) Field of Classification Search
USPC ......... 159/13.3, 24.1, 45, 47.1; 203/7, 22, 24, 203/25, 26, 39; 202/175, 176, 180, 182, 202/185.1, 236; 95/255, 267, 272; 55/462, 55/464, 467

See application file for complete search history.

(56) References Cited

U.S. PATENT DOCUMENTS

| | | | |
|---|---|---|---|
| 6,083,302 A * | 7/2000 | Bauver et al. .................. 95/216 |
| 7,438,129 B2 | 10/2008 | Heins | |
| 7,681,643 B2 | 3/2010 | Heins | |
| 8,469,091 B2 * | 6/2013 | Bjorklund et al. ............ 166/266 |
| 2008/0099154 A1 | 5/2008 | Minnich et al. | |
| 2008/0190607 A1 | 8/2008 | Minnich et al. | |
| 2011/0061867 A1* | 3/2011 | Bjorklund et al. ......... 166/272.1 |

OTHER PUBLICATIONS

Mist Elimination Separations Technology, Koch-Otto York, Brochure, Printed 2003.*
Edward L. Brady, Chemical Nature of Silica Carried by Steam, *J. Phys. Chem.*, 1953, 57 (7) pp. 706-710, DOI: 10.1021/j150508a025 Publication Date: Jul. 1953 (5 pages).

* cited by examiner

*Primary Examiner* — Nina Bhat
*Assistant Examiner* — Jonathan Miller
(74) *Attorney, Agent, or Firm* — GE Global Patent Operation; Catherine J. Winter

(57) ABSTRACT

A method and apparatus for producing high purity distillate in evaporators. is useful for evaporation of waters where volatile silica or organic compounds are encountered such as in production of hydrocarbons from geological formations. An evaporator having a contaminant reduction system is provided. The contaminant reduction system includes an upflow first mist eliminator portion to remove entrained liquid droplets and produce an intermediate purity water vapor stream. A continuous spray system provides a spray of dilute caustic solution in a selected spray configuration for mass transfer contact with the passing intermediate purity water vapor stream, to remove volatile silica compounds therefrom, and produce a partially decontaminated steam stream having mist particles therein. An upflow second mist eliminator portion is provided to remove the residual mist particles, and produce a high purity water vapor stream. The high purity water vapor stream is condensed to provide a high purity distillate stream.

25 Claims, 4 Drawing Sheets

METHOD FOR REDUCTION OF CONTAMINANTS IN EVAPORATOR DISTILLATE

CROSS REFERENCE TO RELATED APPLICATION

The present application claims priority benefit under 35 USC §119 of U.S. Provisional Patent Application Ser. No. 61/278,376 filed Oct. 5, 2009.

TECHNICAL FIELD

The method and apparatus disclosed and claimed herein relates to treatment of waters containing solutes in evaporation equipment. More specifically, the method and apparatus disclosed herein relates to techniques for efficiently and reliably generating distillate in evaporation equipment that is substantially free from undesirable solutes.

BACKGROUND OF THE INVENTION

Evaporation of waters containing various solutes has become routine in many industrial operations. For example, evaporative based water treatment systems are now widely used for treatment of cooling tower blowdown, whether in electric power generation operations or in other industrial facilities. Also, the treatment of produced waters in oil and gas production, including production of oil from tar sands or other heavy oils, is necessary in order to condition such waters for discharge or for reuse. In some heavy oil recovery operations, the treatment of produced waters through the use of evaporators has become routine, resulting in the production of distillate that is subsequently sent to steam generators which generate steam for downhole use in the further production of heavy oil. Various types of steam generators produce steam at various pressures, but in any event, as steam generation pressures increase, the sensitivity of the steam generators to the presence of silica in feedwaters is heightened. Increased silica levels generally require increased steam generator blowdown rates, or result in increased operational costs of anion exchange equipment, or both. To avoid such costs and related operational problems, it would be desirable, when using evaporation equipment for the treatment of waters containing undesirable contaminants, and particularly when treating waters having therein somewhat volatile contaminants such as silica, to provide a method to minimize presence in evaporator distillates of such undesirable solutes, recognizing that undesirable solutes are normally present at least to some limited degree in the evaporating vapor stream within evaporation equipment.

Further, it would be desirable to provide an apparatus for reduction of the carryover of such undesirable volatile contaminants in evaporation systems. When silica ($SiO_2$) is present at a high concentration (for example, as a percent of total brine) in an evaporation system, it will polymerize into an amorphous species having relatively high molecular weight. In the temperature range of normal operation in water treatment evaporators, such amorphous species have essentially no vapor pressure. However, when silica ($SiO_2$) is present at a low concentration in a feedwater stream (for example, in the parts per million range), a significant portion of such silica present in the feedwater will not polymerize. A problem arises since silica molecules ($SiO_2$) have a small vapor pressure in the normal operating temperature range of wastewater treatment evaporators. Therefore, volatile silica represents a small portion of the vapor generated by evaporation of water in such evaporators. Therefore, it would be desirable to address the problem of contamination of evaporator distillates by such volatile silica in wastewater evaporators. It would be especially desirable to address and resolve such problems when evaporators are used to treat produced waters in heavy oil production (especially tar sands production), and thus significantly minimize or avoid the resultant contamination of evaporator distillate in such operations.

BRIEF DESCRIPTION OF THE INVENTION

A process, and an apparatus useful for carrying out the process is described for producing high purity distillate from a feedwater stream that has water and volatile silica therein. In some applications, feedwaters may also contain volatile organic compounds. For example, in an embodiment, feedwater streams may be provided as produced water resulting from hydrocarbon production, such as oil from oil sands, primary or enhanced recovery for oil and/or gas, or from recovery of gas from shale or coal beds. In an embodiment, feedwaters from other industrial activities, such as power generation, mining, or materials processing, may produce feedwaters having one or more of the above mentioned characteristics.

In an embodiment, a vertical tube, falling film evaporator system is provided for evaporating a feedwater stream, such as the aforementioned produced water, and generating therefrom a contaminated steam stream having therein (i) entrained water droplets having solutes therein, volatile silica compounds, and volatile organic compounds. In an embodiment, a vertical tube, falling film evaporator system includes an evaporator body having a vertical condenser with an outer wall, and a sump with an inner wall. Often, the vertical condenser is configured for secure mating engagement to an upper portion of the sump.

In an embodiment, a caustic mixing system is provided. A suitable caustic mixing system may include a caustic supply tank, a mixer, and a dilute caustic tank. Such a caustic mixing system is generally configured to mix concentrated caustic with water to provide a dilute caustic solution. The dilute caustic solution is fed to a contamination reduction system which may, in an embodiment, be provided as set forth herein. In an embodiment, the contamination reduction system may include a multi-pass mist eliminator system. In an embodiment, a contamination reduction system may be located in an annular space between the outer wall of the condenser and the inner wall of the sump. A suitable contamination reduction system may include (1) an upflow first mist eliminator portion, (2) a continuous spray system, and (3) an upflow second mist eliminator portion.

In an embodiment, the upflow first mist eliminator portion may be provided as chevron type mist eliminators configured for removing entrained water droplets to produce an intermediate purity water vapor stream. A continuous spray system is located above the upflow first mist eliminator portion, and is configured to continuously provide droplets of the dilute caustic solution in a selected spray configuration to achieve mass transfer contact with the intermediate purity water vapor stream to remove therefrom at least some of the volatile silica ($SiO_2$) compounds and at least some of the volatile organic compounds, if present, and to produce a partially decontaminated steam stream having entrained residual mist particles therein. In particular, volatile silica ($SiO_2$) that contacts the dilute caustic solution will react with the dilute caustic solution to convert the volatile silica into silica hydroxide complexes, which do not exert vapor pressure at the normal operating temperature ranges for such evaporators (for example, at the boiling point of a selected feedwater, as will be understood by those of skill in the art and to whom this specification is addressed). Then, an upflow second mist eliminator portion is provided located vertically above the continuous spray system. The upflow second mist eliminator portion may be sized and shaped to remove the entrained mist particles, to produce a high purity water vapor stream. In an embodiment, the upflow second mist eliminators may be provided as wire mesh pad mist eliminators. In an embodiment, the evaporator system may be a mechanical vapor compression system, and in such case, the evaporator system further includes a compressor which is configured to compress the high purity water vapor stream. The high purity water vapor stream is then sent to the vertical condenser which is in turn configured to condense the high purity water vapor stream to produce a high purity distillate in which the presence of silica compounds (and where present in the feedwater, and volatile organic compounds) is significantly reduced, or in some cases, virtually eliminated, as compared to quality levels of evaporator distillate in prior art equipment and process methods.

BRIEF DESCRIPTION OF THE DRAWING

In order to enable the reader to attain an appreciation of the novel method and apparatus for the removal of undesirable solutes from distillates resulting from evaporative water treatment processes, attention is directed to the following detailed description when considered in connection with the accompanying figures of the drawing, wherein.

The foregoing figures, being merely exemplary, contain various elements that may be present or omitted from actual equipment embodiments and/or process flow configurations, depending upon the circumstances for a particular process application. An attempt has been made to draw the figures in a way that illustrates at least those elements that are significant for an understanding of the various embodiments and aspects of the invention. However, various elements useful for various process methods as well as apparatus useful in carrying out such methods, are also shown and briefly described to enable the reader to understand how various features, including optional or alternate features, may be utilized in combination in order to provide an efficient evaporator distillate contamination reduction system.

DETAILED DESCRIPTION OF THE INVENTION

Figure 1:
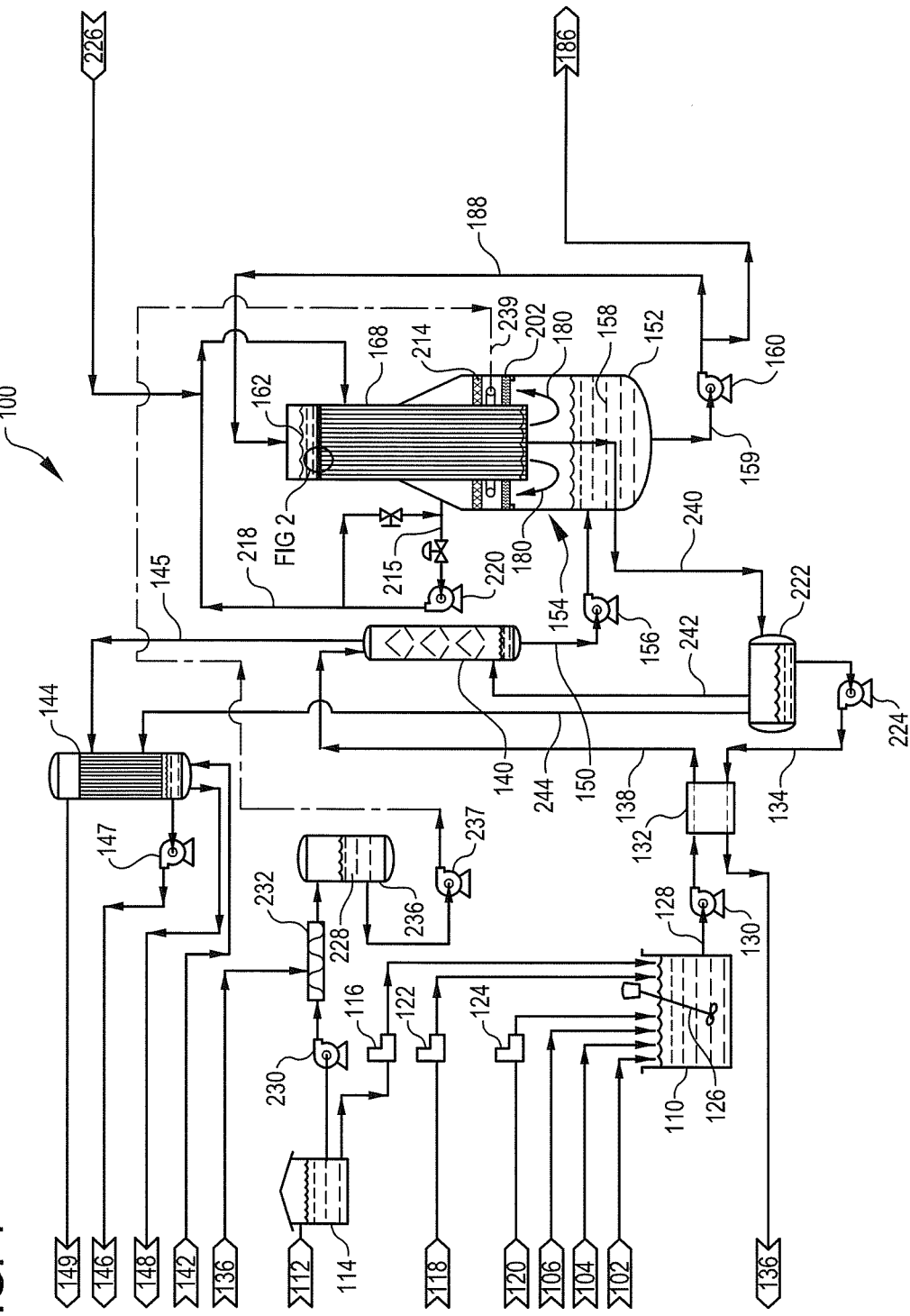
FIG. 1 shows a vertical, falling film, vapor compression evaporator wherein the process flow diagram depicts the equipment utilized in an advantageous method for reduction of solutes in evaporator distillate, showing operational details including the production of steam from a falling brine film, with unevaporated liquid falling into the sump, and with an upward flow of steam vapors containing (a) particulate carryover (droplets having solutes therein), (b) volatile (and/or semi-volatile) organic compounds, and/or (c) volatile silica compounds, turning upward to encounter an embodiment for an evaporator distillate contamination reduction system, shown in an annular configuration within the evaporator body.

Attention is directed to FIG. 1, which provides a flow schematic detailing a vertical tube, falling film, mechanical vapor compression evaporator system 100, which is one useful evaporator design in which the apparatus and method for reduction of contaminants in evaporator distillate, to which this specification is directed, may be effectively employed. As depicted in such an embodiment, the evaporator system 100 is shown as configured for use in treating produced water from hydrocarbon production operations, such as the recovery of heavy oil from tar sands. Produced water 102, any makeup water 104, and optionally blowdown 106 from steam generators (not shown) is collected and delivered to an evaporator feed tank 110. Caustic 112 (such as sodium hydroxide) is provided to caustic tank 114. Caustic 112 may be provided (as required by process conditions) by caustic pump 116 to evaporator feed tank 110. Optionally, scale inhibitors 118 and/or antifoam 120 may be added via pumps 122 and 124, respectively, to evaporator feed tank 110. A mixer 126 may be utilized to thoroughly mix and blend the materials in the evaporator feed tank 110 to produce a combined feed stream 128. In an embodiment, such as high pH evaporator operations in treating de-oiled produced water in tar sands production operations, caustic 112 is added to raise the pH of the combined feed stream 128 to a suitable pH, such as in the range of from about 9 to about 12 to assure that silica present in the produced water stream 102 is soluble throughout the evaporative process, i.e., as the silica concentration within the evaporator is increased during concentration up to a selected concentration factor, as will be understood by those of skill in the art and to whom this specification is directed.

The combined feed stream 128 is removed from evaporator feed tank 110 via primary feed pump 130, and sent to heat exchanger 132, where high purity hot distillate 134 exchanges sensible heat with the incoming combined feed stream 128 to produce a high purity cool clean distillate stream 136. Thus, the incoming combined feed stream 128 is heated to the boiling point in heat exchanger 132. The heated feed stream 138 is sent to a deaerator 140, which removes non-condensable gases such as oxygen and nitrogen, and which with some types of produced water 102 or with some other evaporator feedwaters removes components that are susceptible to steam stripping to the extent the same occurs in deaerator 140. Coolant stream 142 (usually water or glycol solution) is provided to vent condenser 144 to condense steam and other condensibles leaving the deaerator 140 via overhead line 145. Resultant vent condensate 146 is removed via vent condensate pump 147. Heated coolant 148 is returned to a coolant supply system (not shown). Actual non-condensable gases 149 leaving vent condenser 144 are discharged as appropriate, sometimes to the atmosphere, but in various oil and gas operations more often to a plant flare system (not shown).

A hot deaerated feed stream 150 is sent to the sump 152 of evaporator 154, usually via a secondary feed pump 156. In the evaporator sump 152, the hot deaerated feed stream 150 combines with the hot concentrated recirculating brine 158 that is being recirculated within evaporator 154 via recirculation pump 160. The concentrated brine 158 in the evaporator 154 is removed via recirculation duct suction line 159 and recirculated via recirculation pump 160 in a manner that only a small portion of the hot concentrated brine 158 is removed on any one pass through the evaporator 154.

Figure 2:
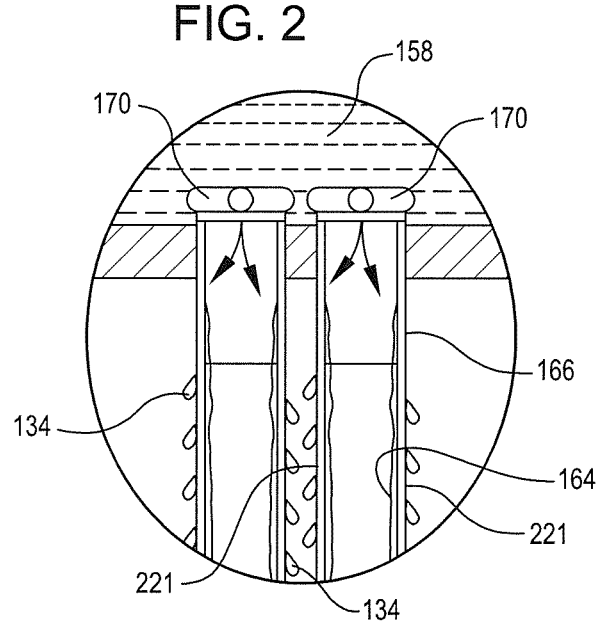
FIG. 2 provides details of an embodiment for the distribution of concentrated brine to vertical tubes in preparation for evaporation of a portion thereof, as well as the location of condensation to form high purity distillate along the outer tube walls in a vertical tube condenser in a falling film evaporator configuration.
Figure 3:
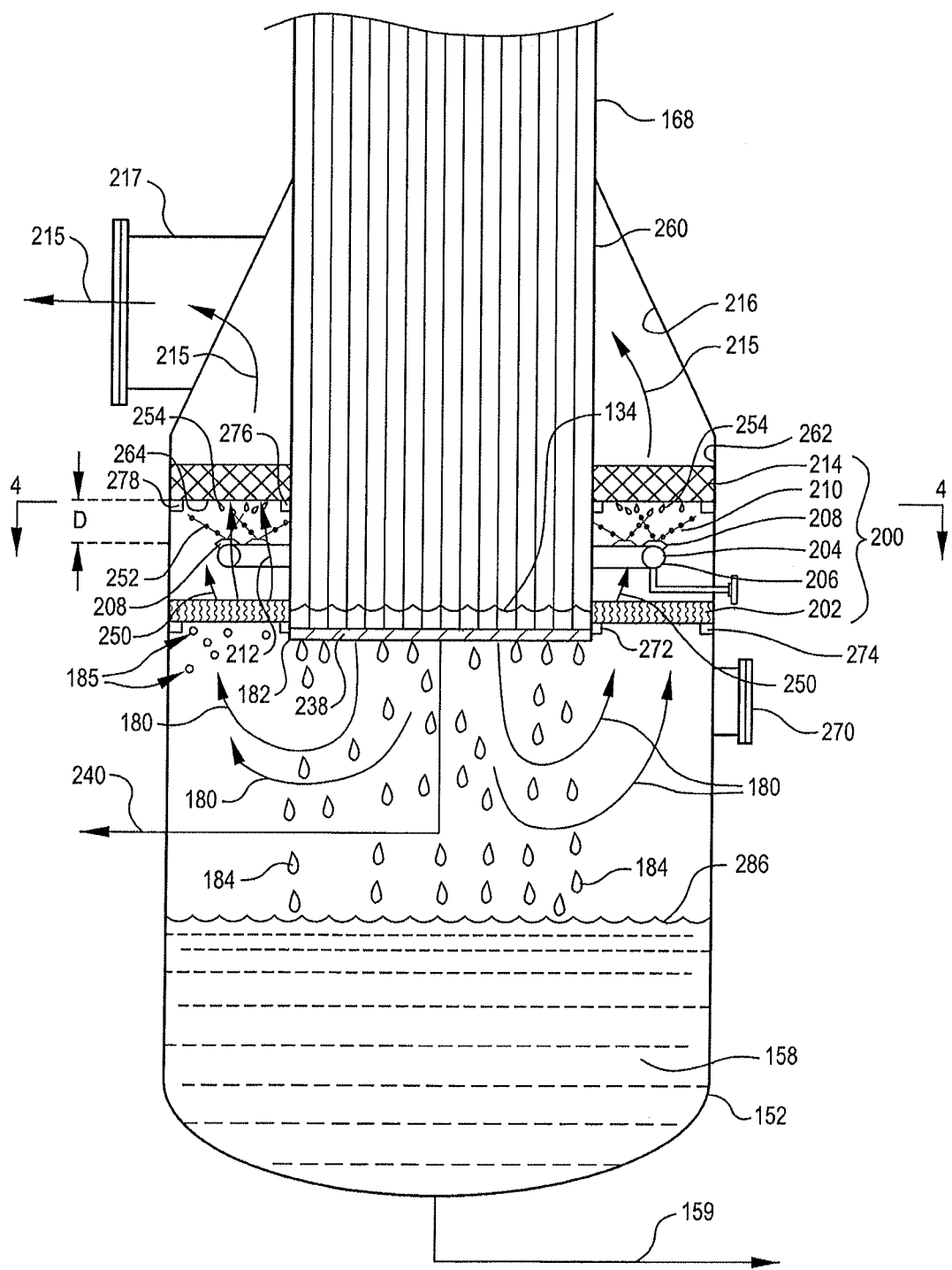
FIG. 3 provides, in a partial cross-sectional view, a vertical tube, falling film evaporator body in a configuration useful in the practice of the method disclosed herein is depicted, showing operational details including the production of steam from a falling brine film, with unevaporated liquid falling into the sump, and with an upward flow of steam vapors containing (a) particulate carryover (droplets having solutes therein), (b) volatile (and/or semi-volatile) organic compounds, and/or (c) volatile silica compounds, then turning upward to encounter an embodiment of an evaporator distillate contamination reduction system, shown in an annular configuration within an evaporator body, where the contamination reduction system includes a chevron mist eliminator portion, a circular spray distributor ring having spray nozzles directing dilute caustic solution spray outward to contact an intermediate purity water vapor stream exiting the chevron mist eliminators, and then a wire mesh mist eliminator portion to further remove residual mist particulates from a partially decontaminated steam stream.

In a falling film evaporator embodiment, the hot concentrated brine 158 is sent to floodbox 162, from which (as seen in FIG. 2) may be directed as a thin brine film 164 inside the tubes 166 of condenser 168 via liquid distributors 170. As shown in FIGS. 2 and 3, a small portion of the water in the thin brine film 164 is extracted in the form of a contaminated steam stream 180, which exits from inside tubes 166 at the bottom 182 of condenser 168, as depicted by noted reference arrows. Unevaporated liquid 184 falls from bottom 182 of condenser 168 to the surface 286 of concentrated brine 158 in sump 152. Concentrated brine 158 is removed from the recirculation line 188 through a recirculating brine purge line 186 (as seen in FIG. 1) to maintain a desired total dissolved solids level (totally or with respect to individual constituents, as appropriate) in the concentrated brine 158.

For pH control within evaporator 154, it may be useful to add a selected base such as caustic 112 to the concentrated brine 158, which can be accomplished by direct injection of a selected base such as caustic 112 into the sump 152, or by feed of a selected base such as caustic 112 into the suction of recirculation pump 160, i.e., into recirculation duct suction line 159.

As better seen in FIG. 3, contaminated steam stream 180 includes both particulate carryover 185 (in the form of small liquid droplets having solutes therein) and vapor phase contaminants, the latter often including volatile silica compounds, as well as volatile and semi-volatile organics, all of which may vary depending upon the composition of the incoming produced water stream 102 or other feed stream provided to the evaporator system 100. Contaminated steam stream 180 is passed through a contaminant reduction system 200, which in an embodiment includes as upflow first pass mist eliminator portion 202 selected chevron type mist eliminators for removal of particulate carryover 185 in the form of small liquid droplets having solutes therein. Then, a dilute caustic wash continuous spray system 204 is provided, here depicted as a generally circular spray distributor ring 206 having spray nozzles 208 for discharge of a dilute caustic solution spray 210 therefrom, and through which an intermediate purity water vapor stream 250 passes (intermediate purity water vapor stream 250 being the contaminated steam stream 180 after removal of particulate carryover 185), to produce a partially decontaminated steam stream 212 having entrained mist particles 254 therein. The dilute caustic solution spray 210 is useful for the removal of volatile silica compounds, as well as for removal of certain volatile and semi-volatile organics, especially volatile organic acids which are converted to salts by reaction with the dilute caustic solution spray 210. Then, the partially decontaminated steam stream 212 enters the upflow second mist eliminator portion 214, which in an embodiment may be provided using mesh pad mist eliminators, where the mist particles 254 are removed, to produce a high purity water vapor stream 215. The high purity water vapor stream 215 is removed via collector 216 and outlet 217, and is sent to compressor 220, where pressure of the high purity water vapor stream 215 is increased, to produce a decontaminated compressed steam 218. Thus, in an embodiment, after being compressed as just described, the high purity water vapor stream 215 is condensed at condenser 168 on the outer wall 221 of tubes 166, to produce high purity hot distillate 134. The high purity hot distillate 134 is collected at a distillate tank 222, and sent via distillate pump 224 to heat exchanger 132, as explained above. Heating and startup of the evaporator 154 may be assisted using a source of steam 226 as convenient.

For preparation of dilute caustic solution 228 for use in the contaminant reduction system 200, caustic may be provided from caustic tank 114 through caustic pump 230 to an in-line mixer system 232 where caustic 112 is mixed in an embodiment, with clean distillate 136 to produce a dilute caustic solution 228 of suitable concentration, for example, wherein the dilute caustic solution 228 is in a concentration of from about 400 ppm (parts per million) to about 800 ppm. The dilute caustic solution 228 is stored in a caustic wash tank 236, and then sent via dilute caustic pump 237 to dilute caustic feed line 239, and thence to the spray distributor ring 206.

The contaminant reduction system 200 provides an improved multi-pass internal mist elimination system for evaporators, and in an embodiment, for falling film evaporator bodies. Using an internal mist elimination system as the basis for the contaminant reduction system 200 described herein only adds a small cost to the evaporator system 100 equipment, and is believed to provide improved results as to distillate purity, especially as compared to prior art internal mist elimination systems in wastewater evaporators.

The high purity distillate 134 condensing on the outer wall 221 of heat transfer tubes 166, which those of ordinary skill in the evaporation arts and to which this disclosure is directed may variously refer to as either condensate or distillate, is, as a result of the contamination reduction system 200 taught herein, and the method of using the same, in relatively pure form, low in total dissolved solids, and with very low levels of volatile contaminants, such as volatile silica or volatile organic acids. In one embodiment, high purity distillate 134 quality has been projected to contain 0.05 ppm (parts per million) or less of total hardness (as $CaCO_3$), 1.0 ppm or less of non-volatile total organic carbon, 0.2 ppm or less oily matter, and 0.2 ppm or less silica (as $SiO_2$). Such a level of contamination is far below levels previously obtained on a routine basis in falling film evaporators, namely distillate purity in the range of from about 5 parts per million to about 10 parts per million of total dissolved solids for all non-volatile components.

In a falling film evaporator embodiment, high purity distillate 134 descends by gravity along the outer wall 221 of tubes 166 in condenser 168 and accumulates above bottom tube sheet 238, from where it is collected via condensate line 240 and sent to distillate tank 222. A small portion of steam in equilibrium with high purity distillate 134 may be sent via coolant stream 242 to the earlier discussed deaerator 140 for use in mass transfer, i.e, heating and steam stripping descending heated feed stream 138 to remove non-condensable gases. Vent line 244 from distillate tank 222 is routed to vent condenser 144, to avoid accumulation of non-condensables in distillate tank 222, and to avoid contamination of distillate with non-condensable such as dissolved oxygen.

In the method disclosed herein, the de-oiled produced water stream 102 may be treated and conditioned for feed to one or more mechanical vapor recompression evaporator systems 100 (often, multiple redundant units) to concentrate the incoming produced water stream 102. The necessary treatment and conditioning prior to the evaporator unit 154 can be efficiently accomplished, but may vary somewhat based on feedwater chemistry, for example, the identity and distribution of various dissolved and suspended solids, and on the degree of concentration selected for accomplishment in particular evaporator units 154.

The just described novel combination apparatus for the reduction of contaminants in distillate from evaporator equipment is advantageous in many industrial operations. For example, practice of the method taught herein produces a high purity clean distillate 134 that is of sufficient quality that it is suitable for use in steam generators in heavy oil recovery operations. Many produced waters 102 encountered in heavy oil production are very high in silica, with silica content that may range up to about 200 mg/l as $SiO_2$, or higher. By providing the distillate contaminant reduction system disclosed herein, and by operating it according to the method(s) taught herein, it is possible to provide a high purity distillate 134, in spite of the presence of high levels of silica in the produced water 102 that is processed by the evaporator system 100.

In an embodiment, a method is provided for producing high purity distillate from a contaminated steam stream 180 that is produced within an evaporator system 100. In such method, a contaminated steam stream 180 having entrained particulate carryover 185 in the form of water droplets having solutes therein is created via evaporation of recirculating brine 158. The entrained particulate 185 water droplets have solutes therein. Solutes may often include silica compounds, as well as cations contributing to hardness. In oil and gas recovery operations, such as in the production of oil from tar sands, such solutes may additionally include iron compounds, copper compounds, or other metallic ions. In any event, the entrained particulate 185 water droplets are separated from the contaminated steam stream 180 by passing the contaminated steam stream 180 through a multi-pass mist eliminator system 200. In an embodiment, a multi-pass mist eliminator system 200 may include an upflow first mist eliminator portion 202, a continuous spray system 204, and an upflow second mist eliminator portion 214. In an embodiment, the upflow first mist eliminator portion 202 may be provided as high efficiency chevron mist eliminators of about 14.6 centimeters (5.75 inches) in height, and configured for removing entrained particulate 185 water droplets from the contaminated steam stream 180, to produce an intermediate purity water vapor stream 250. One suitable chevron type mist eliminator useful for the upflow first mist eliminator portion 202 has been found to be a model MCV V21Z free flow ring type as sold by Sulzer Chemtech USA. In an embodiment, such chevron type mist eliminators remove greater than 95% of the entrained particulate 185 water droplets from the contaminated steam stream 180.

An upflow second mist eliminator portion 214 is provided, and as noted above, in an embodiment the upflow second mist eliminator portion 214 may be provided in the form of mesh pad mist eliminators. In an embodiment, the mesh pad mist eliminators may be provided as wire mesh mist eliminators. In an embodiment, the wire mesh mist eliminators may be provided in multiple layers, in the steamflow direction, with the total height of the mesh pad eliminators being about 20.3 centimeters (8 inches). One suitable mist eliminator useful for the upflow second mist eliminator portion 214 has been found to be a model VKR mesh pad type as sold by Sulzer Chemtech USA. The upflow second mist eliminator portion 214 is located at least in part vertically above the upflow first mist eliminator portion 202. In an embodiment, the upflow second mist eliminator portion 214 is provided using vertically overlayed multiple layers of wire mesh pads. Such multiple layers of mesh pad include a plurality of distinct layers, and each distinct layer utilizes a different design than is provided in other distinct layers of the multiple layers of mesh pad. The multiple, distinct layers of mesh pad of varying design remove virtually all of the remainder of the residual carryover mist. Suitable wire mesh sizes, and arrangement thereof in the selected layers, provides that entrained mist particles 254 of varying size impinge on, and thus collect on, different size wire mesh pads, e.g., wires of differing diameter and mesh pads of differing density. By selecting suitable sizes, based on conventional design factors for such wire mesh pads as will be understood by those of skill in the art and to whom this specification is addressed, coalesced mist droplets flow downward on the wire, and come together at wire intersections, so as to grow in size and finally be directed into troughs, which troughs protect the liquid from the upward flowing water vapors. The liquids that are collected in troughs flows to the interior wall 262 of sump 152.

Figure 4:
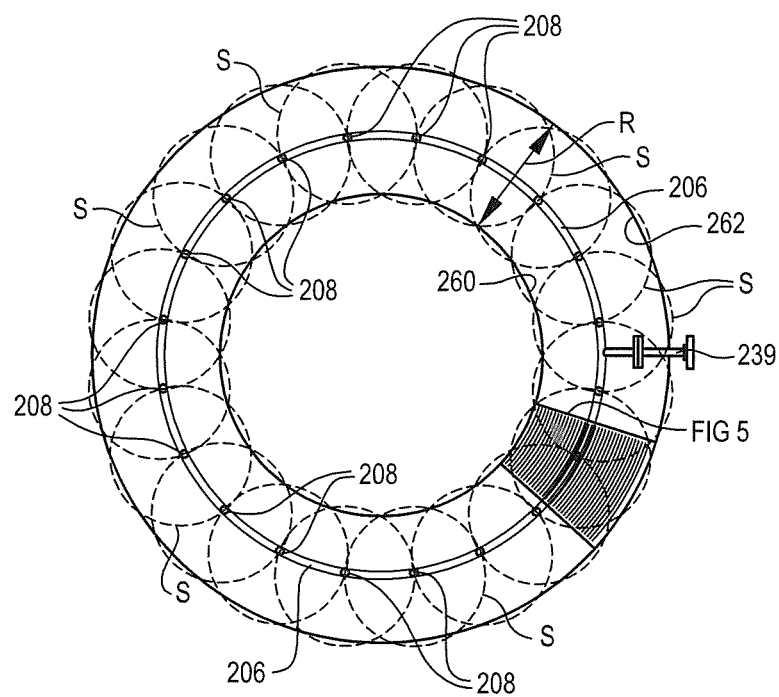
FIG. 4 provides a cross-sectional view of an evaporator body, taken along line 4-4 of FIG. 3, showing the annular configuration for location of mist eliminator segments between a condenser outer wall and a sump inner wall, as well as a generally circular spray distributor provided for distributing dilute caustic via spray nozzles in an exemplary overlapping spray pattern for providing the dilute caustic spray for contact with (a) an intermediate purity water vapor stream being decontaminated, and (b) the lower portion of the wire mesh mist eliminators, to wash the mesh pad mist eliminators and thus assist in keeping the mesh pad mist eliminators free of residual solids.
Figure 5:
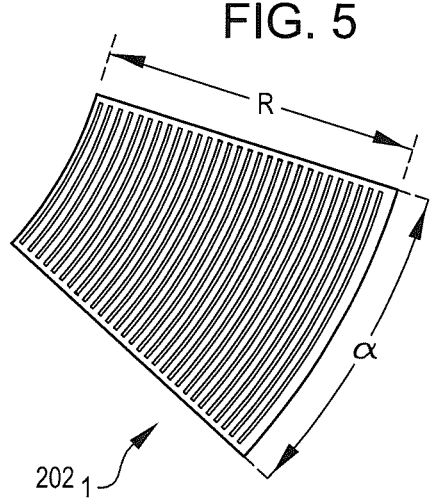
FIG. 5 shows a plan view of an embodiment for layout of a segment of chevron mist eliminators, depicting use of an annular segment of a selected arc alpha ($\alpha$).

FIG. 5 depicts a suitable shape for an individual segments $202_1$ in an embodiment of the upflow first mist eliminator portion 202. A complete annular ring may be provided by a plurality of individual segments $202_1$ through $202_N$ wherein N is a positive integer. In an embodiment, each of the individual segments $202_1$ through $202_N$ are provided in a radial dimension R for each annular portion, roughly as noted above (i.e., for close fitting placement between outer wall 260 and inner wall 262). And, so that each individual segment $202_1$ may be placed into the evaporator body 154 after erection on site (via manhole 270 as shown in FIG. 3, for example), and to assure replacement capability, each individual segment $202_1$ segment may be provided in a convenient dimensional angular arc alpha ($\alpha$) such as about fifteen (15) degrees. As seen in FIGS. 3 and 4, the individual segments $202_1$ of upflow first mist eliminator portion 202 are configured to rest between a first inner ring 272 at outer wall 260 and a first outer ring 274 at inner wall 262.

Figure 6:
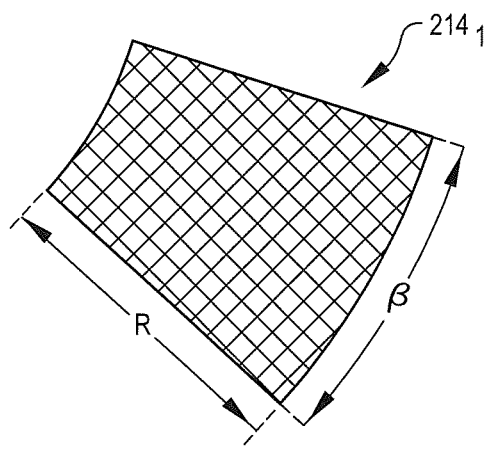
FIG. 6 is similar to FIG. 5, but now shows a plan view of an embodiment for wire mesh pad mist eliminators, and depicting use of an annular segment of a selected arc beta ($\beta$).

FIG. 6 depicts a suitable shape for an individual segments $214_1$ in an embodiment of the upflow second mist eliminator portion 214. A complete annular ring may be provided by a plurality of individual segments $214_1$ through $214_N$ wherein N is a selected positive integer. In an embodiment, each of the individual segments $214_1$ through $214_N$ are provided in a radial dimension R for each annular portion, roughly as noted above (i.e., for close fitting placement between outer wall 260 and inner wall 262). And, so that each individual segment $214_1$ may be placed into the evaporator body 154 after erection on site (via manhole 270 as shown in FIG. 3, for example), and to assure replacement capability, each individual segment $214_1$ segment may be provided using a convenient dimensional angular arc beta (β) such as about fifteen (15) degrees. Also as seen in FIG. 3, the individual segments 214₁ etc. are configured to rest between a second inner ring 276 at outer wall 260 and a second outer ring 278 at inner wall 262.

In an embodiment, the continuous spray system 204 may be located above the upflow first mist eliminator portion 202. The continuous spray system 204 may be located below the upflow second mist eliminator portion 214 by a distance D. In an embodiment, the distance D may be about 66 centimeters (about 26 inches). The continuous spray system 204 may be configured for providing droplets 252 of dilute caustic solution in a selected spray 210 configuration for mass transfer contact with the intermediate purity water vapor stream 250, to produce an intermediate purity water vapor stream having entrained residual mist particles 254 therein. As noted in FIG. 4, in an embodiment, the generally circular spray distributor ring 206 has a plurality of spray nozzles 208 thereon. While the size and shape of the spray pattern used will depend on the size and shape between the outer wall 260 of the vertical condenser 168 and the inner wall 262 of the sump 152, as shown in FIG. 4, the annular area between outer wall 260 and inner wall 262 may be covered with a dilute caustic spray solution in an overlapping coverage configuration. As noted in FIG. 4, spray nozzles 208 may be located about every 45.7 centimeters (about 18 inches) round the spray distributor ring 206, with a circular spray pattern having roughly the same diameter as (or slightly more than) the radial distance R between the outer wall 260 and the inner wall 262. In that manner, coverage of circular spray patterns, depicted by reference numeral S in FIG. 4, overlap approximately half due to the spray pattern S from each adjacent spray nozzle 208. As seen in FIG. 3, the spray 210 from nozzles 208 provides droplets 252, of dilute caustic solution and the pattern of spray 210 is configured to reach the bottom 264 of upflow upper mist eliminators, 214 (in an embodiment, wire mesh pads having multiple layers). In this manner, the spray 210 wets the bottom 264 of the mist eliminators 214, thereby washing them and assist in keeping the same free from the deposit of undesirable solids thereon. The multi-pass mist eliminator system just described, including mist eliminators 202, continuous spray system 204, and upflow upper mist eliminators 214, substantially removes the entrained particulate 185 water droplets from the contaminated steam stream 180, and removes the entrained mist particles 254 from the partially decontaminated steam stream 212, to produce a high purity water vapor stream 215. The high purity water vapor stream 215, after compression via compressor 220 (in embodiments where a mechanical vapor compressor is used) is then condensed to produce a high purity distillate 134, which may be cooled in heat exchanger 132 to provide a high purity cool distillate 136.

In an embodiment where solutes in the entrained water droplets have silica therein, it is expected that a high purity distillate can be provided wherein the silica content is at about 0.20 ppm or less, as $SiO_2$. Further, when the contaminated steam stream 180 includes volatile silica constituents, the operation of the continuous caustic spray system removes volatile silica from the intermediate purity water vapor stream 250.

Empirical data on vapor liquid equilibria for all silica species indicates that the continuous spray system 204 using the dilute caustic spray 210 will reduce $SiO_2$ vapor that may be present in the contaminated steam stream 180 by a factor of more than 100. Further, it is expected that the same method and apparatus will remove volatile silica present in the contaminated steam stream 180 by a factor of from between 100 and 1000. The sodium hydroxide (NaOH) within the dilute caustic spray 210 dissolves the $SiO_2$, and converts the same to ionic species without vapor pressure at the operating conditions.

When the contaminated steam stream 180 includes volatile organic compounds, the operation of the continuous spray system 204 removes many of such volatile organics compounds from the intermediate purity water vapor stream 250. At least in part, this is because many of the volatile organic compounds show a preferential distribution to liquid over vapor, sometimes in the range of 1,000 to one, or higher.

It is to be appreciated that the method and apparatus described herein is an appreciable improvement in the state of the art of evaporative treatment of solute containing waters, especially in waters having a relatively high silica content. The process provides a unique configuration of process techniques and apparatus for processing solute containing waters in mechanical evaporators, and in an embodiment, in mechanical vapor recompression evaporators. The process thus improves on currently used evaporative water treatment methods by improving the quality of distillate produced by the evaporation equipment. The method and apparatus disclosed herein may be used for treating produced water from tar sands or other heavy oil production operations, or from conventional or enhanced recovery oil and gas production operations, or from methane production such as from fractured shale or coal beds. Also, contaminated waters from other mining or industrial operations may be treated using the method and apparatus disclosed herein for removal of particulates containing undesirable solutes from a contaminated steam stream in an evaporation system, or the removal of substantial amounts of volatile or semi-volatile organics, especially volatile organic acids, and/or silica compounds that are volatile in steam produced within evaporators, in order to produce high purity evaporator distillate.

Although only an exemplary embodiment has been described in detail, it will be readily apparent to those skilled in the art that the novel methods and apparatus configuration provided for implementing the process may be modified from the exact description provided herein, without materially departing from the novel teachings and advantages provided, and may be embodied in other specific forms without departing from the spirit or essential characteristics thereof. Therefore, the disclosure presented herein is to be considered in all respects as illustrative and not restrictive. The scope of the invention is defined by the claims, and may include other examples. Such other examples are intended to be within the scope of the claims if they have structural elements that do not differ from the literal language of the claims, or if they include equivalent structural elements with insubstantial differences from the literal language of the claims. Further, while certain process steps are described for the purpose of enabling the reader to make and use certain process elements shown, such suggestions shall not serve in any way to limit the claims to the exact variation disclosed, and it is to be understood that other variations may be utilized in the practice of the method. The scope of the invention, as described herein and as indicated by the appended claims, is thus intended to include variations from the embodiments provided which are nevertheless described by the broad meaning and range properly afforded to the language of the claims, as explained by and in light of the terms included herein, or the legal equivalents thereof.

We claim:

1. A method for producing high purity distillate from a contaminated steam stream that is produced within an evaporator system, said method comprising:

(a) providing a contaminated steam stream having entrained water droplets therein, said entrained water droplets comprising solutes therein;

(b) separating said entrained water droplets from said contaminated steam stream by passing said contaminated steam stream through a contaminant reduction system, said contaminant reduction system comprising (1) an upflow first mist eliminator portion, said first mist eliminator portion removing said entrained water droplets from said contaminated steam stream to produce an intermediate purity water vapor stream, (2) an upflow second mist eliminator portion, said second mist eliminator portion located at least in part vertically above said upflow first mist eliminator portion, and (3) a continuous spray system, said continuous spray system located above said upflow first mist eliminator portion and below said upflow second mist eliminator portion, said continuous spray system providing droplets of dilute caustic solution spray in a selected configuration for mass transfer contact with said intermediate purity water vapor stream to produce a partially decontaminated steam stream having mist particles therein;

(c) said contaminant reduction system substantially removing said entrained water droplets from said contaminated water vapor stream, and removing said mist particles from said partially decontaminated steam stream to produce a high purity water vapor stream;

(d) condensing said high purity water vapor stream to produce said high purity distillate.

2. The method as set forth in claim 1, wherein said upflow first mist eliminator portion comprises chevron mist eliminators.

3. The method as set forth in claim 2, wherein said chevron mist eliminators remove greater than ninety five percent (95%) of said entrained water droplets from said contaminated steam stream.

4. The method as set forth in claim 1 or claim 3, wherein said upflow second mist eliminator portion comprises a plurality of mesh pad mist eliminators.

5. The method as set forth in claim 4, wherein said plurality of mesh pad mist eliminators comprises multiple layers of mesh pad.

6. The method as set forth in claim 5, wherein said multiple layers of mesh pad comprise a plurality of distinct layers, and wherein each distinct layer comprises a different design than provided in other distinct layers of said multiple layers of mesh pad.

7. The method as set forth in claim 1, wherein said contaminated steam stream further comprises volatile silica, and wherein operation of said continuous spray system removes volatile silica from said intermediate purity water vapor stream.

8. The method as set forth in claim 7, wherein volatile silica present in said contaminated steam stream is removed by a factor of more than 100.

9. The method as set forth in claim 8, wherein volatile silica present in said contaminated steam stream is removed by a factor of from between 100 and 1000.

10. A method for producing high purity distillate from a produced water stream in hydrocarbon production operations, comprising:

(a) feeding a produced water stream to an evaporator;

(b) heating the produced water in said evaporator to produce a contaminated steam stream having (i) volatile silica and (ii) entrained water droplets therein, said entrained water droplets comprising solutes therein;

(c) cleaning said contaminated steam stream to produce a high purity water vapor stream, by (1) passing said contaminated steam stream through an upflow chevron mist eliminator to remove ninety five percent (95%) or more of said entrained water droplets and producing an intermediate purity water vapor stream, (2) scrubbing said intermediate purity water vapor stream by passage through a continuous spray system, said continuous spray system comprising emission of fine droplets of dilute caustic solution into said intermediate purity water vapor stream, said fine droplets of dilute caustic solution configured for mass transfer contact with said intermediate purity water vapor stream to remove volatile silica from said intermediate purity water vapor stream, to produce a partially decontaminated steam stream having residual entrained mist particles therein, (3) removing said residual entrained mist particles from said intermediate purity water vapor stream by passing said partially decontaminated steam stream through an upflow mesh pad mist eliminator to produce a high purity water vapor stream;

(d) condensing said high purity water vapor stream to produce said high purity distillate.

11. The method as set forth in claim 10, wherein said chevron mist eliminator system is provided in an annular configuration.

12. The method as set forth in claim 10, wherein said mesh pad eliminator is provided in an annular configuration.

13. The method as set forth in claim 10, wherein said upflow mesh pad mist eliminator is provided upstream of said upflow chevron mist eliminator, and where said upflow mesh pad mist eliminator and said upflow chevron mist eliminator are each provided in an annular configuration.

14. The method as set forth in claim 13, wherein said upflow chevron mist eliminator and said upflow mesh pad mist eliminator are spaced vertically apart, and wherein said continuous spray system is located therebetween.

15. The method as set forth in claim 10, wherein said mesh pad mist eliminator comprises multiple mesh layers.

16. The method as set forth in claim 10, or in 15, wherein each of said layers in said mesh pad mist eliminator are of varying mesh pad design.

17. The method as set forth in claim 16, wherein said mesh pad mist eliminator comprises a wire mesh.

18. A method for treating a steam stream that is produced within an evaporator system, said method comprising:

(a) removing liquid droplets from the steam stream;

(b) after step a), contacting the steam stream with a caustic solution; and, (c) after step b), removing additional liquid droplets from the steam stream.

19. The method of claim 18 wherein the step b) comprises spraying droplets of the caustic solution into the steam stream.

20. The method of claim 19 wherein the droplets are sprayed into the steam stream continuously.

21. The method of claim 20 wherein step a) comprises flowing the steam stream through a chevron type mist eliminator.

22. The method of claim 21 wherein step (b) comprises flowing the steam stream through a plurality of mesh pads.

23. The method of claim 22 wherein the caustic solution comprises sodium hydroxide.

24. The method of claim 23 wherein the steam stream flows upwards during steps (a), (b) and (c).

25. The method of claim 24 wherein the steam stream contains silica vapor prior to step (a).

* * * * *

UNITED STATES PATENT AND TRADEMARK OFFICE
CERTIFICATE OF CORRECTION

PATENT NO. : 8,603,301 B2  
APPLICATION NO. : 12/893567  
DATED : December 10, 2013  
INVENTOR(S) : William F. Heins and Gregg L. Wilson Page 1 of 1

It is certified that error appears in the above-identified patent and that said Letters Patent is hereby corrected as shown below:

In the Claims

In Column 12, Line 64, delete "step (b)" and insert -- step (c) --, therefor.

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*